United States Patent
Zingler et al.

(10) Patent No.: US 9,918,246 B2
(45) Date of Patent: Mar. 13, 2018

(54) ENHANCING THE USAGE OF RESOURCES RELATED TO THE TRANSMISSION OF ENVIRONMENT-RELATED INFORMATION BETWEEN A USER EQUIPMENT AND A MOBILE COMMUNICATION NETWORK

(71) Applicant: DEUTSCHE TELEKOM AG, Bonn (DE)

(72) Inventors: Olaf Zingler, Bonn (DE); Harald Schmitt, Bendorf (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/446,038

(22) Filed: Mar. 1, 2017

(65) Prior Publication Data

US 2017/0181023 A1    Jun. 22, 2017

Related U.S. Application Data

(63) Continuation of application No. 15/024,371, filed as application No. PCT/EP2014/070698 on Sep. 26, 2014, now Pat. No. 9,699,681.

(30) Foreign Application Priority Data

Oct. 25, 2013   (EP) .................................. 13190186

(51) Int. Cl.
*H04W 72/00*    (2009.01)
*H04W 24/10*    (2009.01)
(Continued)

(52) U.S. Cl.
CPC ......... *H04W 24/10* (2013.01); *H04W 56/001* (2013.01); *H04W 88/02* (2013.01)

(58) Field of Classification Search
CPC .................................................... H04W 24/10
(Continued)

(56) References Cited

U.S. PATENT DOCUMENTS

| | | |
|---|---|---|
| 2009/0070611 A1 | 3/2009 | Bower, III et al. |
| 2010/0010857 A1 | 1/2010 | Fadell |
| 2010/0284287 A1 | 11/2010 | Venuto |

FOREIGN PATENT DOCUMENTS

| | | |
|---|---|---|
| CN | 102138128 A | 7/2011 |
| EP | 2360961 A1 | 8/2011 |

(Continued)

OTHER PUBLICATIONS

Ericsson et al: "DRX solution for IDC interference avoidance", 3GPP Draft; R2-116328 DRX Solution for IDC Interference, 3$^{rd}$ Generation Partnership Project (3GPP), Mobile Cometence Centre; 650, Route Des Lucioles; F-06921 Sophia-Antipolis Cedex; France, vol. RAN WG2, no. San Francisco, US; Nov. 14, 2011-Nov. 18, 2011, Nov. 8, 2011 (Nov. 8, 2011), XP050564540, point 2.2.

(Continued)

*Primary Examiner* — Joel Ajayi
(74) *Attorney, Agent, or Firm* — Leydig, Voit & Mayer, Ltd.

(57) ABSTRACT

A method for transmission of environment-related information between a user equipment and a mobile communication network includes: transmitting measurement configuration information from a mobile communication network to a user equipment; obtaining local network information by conducting a requested measurement; and transmitting the local network information together with at least one other uplink transmission performed by the user equipment to the base station entity by using at least one radio interface of the user equipment.

11 Claims, 1 Drawing Sheet

(51) Int. Cl.
*H04W 56/00* (2009.01)
*H04W 88/02* (2009.01)

(58) Field of Classification Search
USPC .............................................. 455/452.1, 423
See application file for complete search history.

(56) References Cited

FOREIGN PATENT DOCUMENTS

| | | |
|---|---|---|
| EP | 2437540 A1 | 4/2012 |
| WO | 0207365 A2 | 1/2002 |
| WO | 2008044208 A2 | 4/2008 |
| WO | 2008057809 A2 | 5/2008 |
| WO | 2013021832 A1 | 2/2013 |
| WO | 2013034197 A1 | 3/2013 |

OTHER PUBLICATIONS

ETSI TS 136 331 V11.5.0 (Sep. 2013); LTE; Evolved Universal Terrestrial Radio Access (E-UTRA); Protocol specification (3GPP TS 36.331 version 11.5.0 Release 11), pp. 1-351, Sep. 2013.

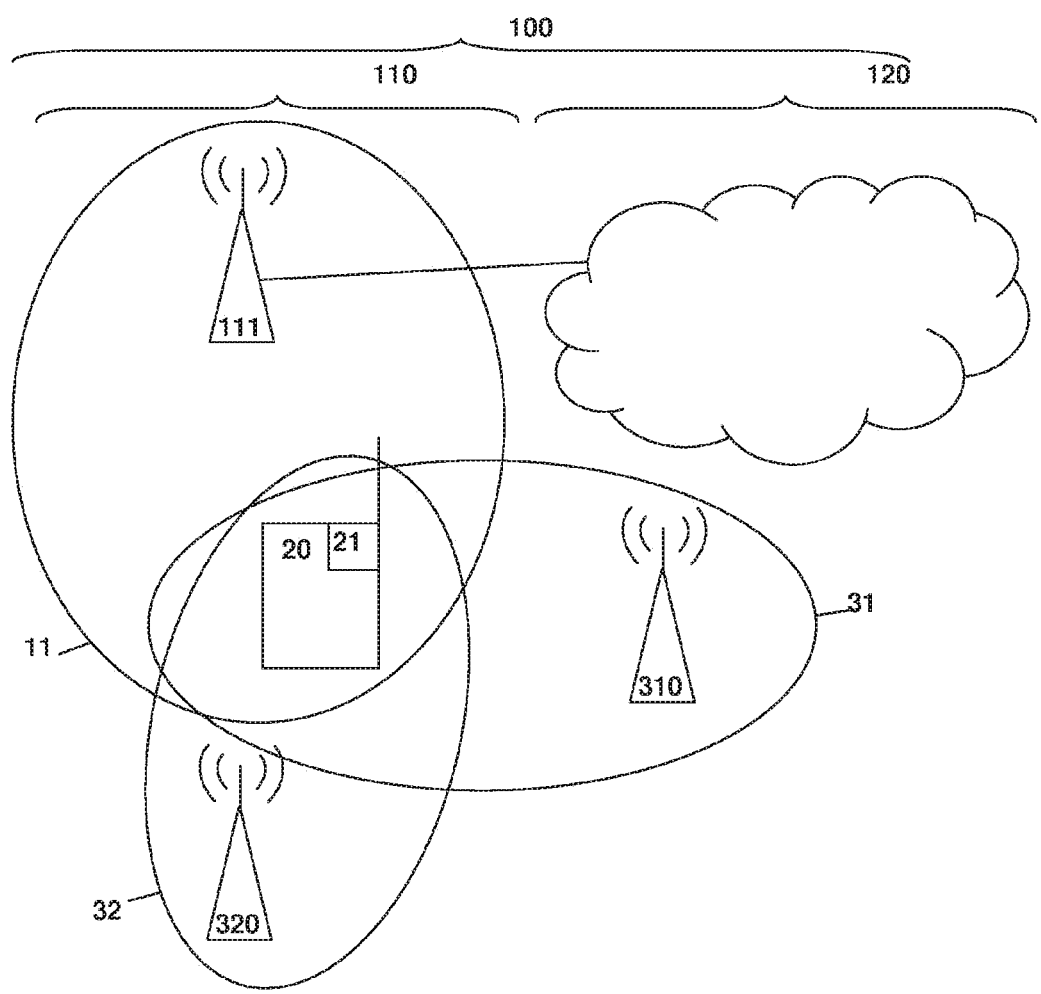

ENHANCING THE USAGE OF RESOURCES RELATED TO THE TRANSMISSION OF ENVIRONMENT-RELATED INFORMATION BETWEEN A USER EQUIPMENT AND A MOBILE COMMUNICATION NETWORK

CROSS-REFERENCE TO RELATED APPLICATIONS

This application is a continuation of copending U.S. patent application Ser. No. 15/024,371, filed Mar. 24, 2016, which is a U.S. National Phase application under 35 U.S.C. § 371 of International Application No. PCT/EP2014/070698, filed on Sep. 26, 2014, and claims benefit to European Patent Application No. EP 13190186.0, filed on Oct. 25, 2013. The International Application was published in English on Apr. 30, 2015 as WO 2015/058925 A1 under PCT Article 21(2). The foregoing applications are hereby incorporated by reference herein.

FIELD

The present invention relates a method for enhancing the usage of user equipment resources and/or network resources related to the transmission of environment-related information between a user equipment and a mobile communication network.

The present invention further relates to a user equipment for enhancing the usage of user equipment resources and/or network resources related to the transmission of environment-related information between the user equipment and a mobile communication network.

Additionally, the present invention relates to a mobile communication network and to a system for enhancing the usage of user equipment resources and/or network resources related to the transmission of environment-related information between the user equipment and the mobile communication network, also especially for the MDT purpose.

BACKGROUND

It is a known feature of conventional mobile communication networks to transmit measurement jobs from base station entities towards connected user equipments in order to perform measurement, especially of the current radio environment of the user equipment.

For the case of an LTE mobile communication network (Long Term Evolution), the 3GPP standardization documents describe the measurement configuration in 3GPP TS 36.331. The main target of the described measurement is to provide inputs for RRM (Radio Resource Management) and mobility purposes. Beside that, the measurements can also be used to deliver inputs for network optimization functions, like generation of a downlink interference matrix based on mobile measurements or the estimation of the geo-location, i.e. the position, of the UE.

Generally, such measurement requirements communicated to user equipments connected to or camping on a radio cell (i.e. a base station entity) necessarily have drawbacks, at least regarding the transmission capacity of the mobile communication network (especially the base station entity) and/or the user equipment. The measurement requirements normally involve additional network communication load (especially on the air interface between the respective user equipment and the concerned base station entity), as well as normally drain the power supply of the user equipments itself, i.e. reduces the residual battery life time (at least in case that the user equipment is not connected to an electrical grid).

SUMMARY

In an embodiment, the present invention provides a method for transmission of environment-related information between a user equipment and a mobile communication network. The mobile communication network comprises a base station entity. The user equipment comprises at least one radio interface. An uplink radio connection between the user equipment and the base station entity is at least able to be established using the at least one radio interface of the user equipment. The method includes: transmitting, in a first step, measurement configuration information from the mobile communication network to the user equipment, wherein a control channel of the mobile communication network is used for the transmission of the measurement configuration information, and wherein the measurement configuration information comprises an indication that a requested measurement, to be conducted by the user equipment and resulting in obtaining local network information, shall be reported to the base station entity together with at least one other uplink transmission performed by the user equipment using the at least one radio interface of the user equipment; obtaining the local network information by conducting the requested measurement, in a second step subsequent to the first step; and transmitting, in a third step subsequent to the second step, the local network information together with the at least one other uplink transmission performed by the user equipment to the base station entity by using the at least one radio interface of the user equipment. During a fourth step subsequent to the second step and prior to the third step, the local network information is logged by the user equipment during a time interval between a point in time of conducting the requested measurement of the local network information and a point in time of the user equipment being uplink synchronized with the base station entity

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 schematically illustrates a mobile communication network and a user equipment that is connected to the mobile communication network via a base station entity of the mobile communication network and via a radio interface of the user equipment, and wherein the user equipment is able to detect the radio environment of the user equipment.

DETAILED DESCRIPTION

In an embodiment, the present invention provides a simple, effective and especially cost effective solution for enhancing the usage of user equipment resources and/or network resources related to the transmission of environment-related information between a user equipment and a mobile communication network. The present invention further provides a user equipment, a mobile communication network, and a system comprising a user equipment and a mobile communication network, such that the exaggerated use of resources (of the mobile communication network and/or of the user equipment) solely for network optimization purposes can be avoided or at least greatly reduced.

In an embodiment, the present invention provides a method for enhancing the usage of user equipment resources and/or network resources related to the transmission of environment-related information between a user equipment and a mobile communication network,
wherein the mobile communication network comprises a base station entity, wherein the user equipment comprises at least one radio interface,
wherein an uplink radio connection between the user equipment and the base station entity is at least able to be established using the at least one radio interface of the user equipment, wherein the method comprises the following steps:
transmitting, in a first step, a measurement configuration information from the mobile communication network to the user equipment, wherein a control channel of the mobile communication network is used for the transmission of the measurement configuration information, and wherein the measurement configuration information comprises an indication that a requested measurement, to be conducted by the user equipment and resulting in obtaining a local network information, shall be reported to the base station entity together with at least one other uplink transmission performed by the user equipment using the at least one radio interface of the user equipment,
obtaining the local network information by conducting the requested measurement, in a second step subsequent to the first step, and
transmitting, in a third step subsequent to the second step, the local network information together with the at least one other uplink transmission performed by the user equipment to the base station entity by using the at least one radio interface of the user equipment.

It is thereby advantageously possible according to the present invention that the realization of uplink synchronization of the user equipment solely for network optimization purposes can either be avoided altogether or at least reduced by an important proportion. Thereby, the use of the method according to the present invention reduces the negative impact of user equipment measurements for network optimization purpose on signalling load, data throughput and user equipment battery (energy) consumption.

In an embodiment, the method allows the radio access network of the mobile communication network to configure measurement configurations which give the user equipment more freedom to perform configured measurements (e.g. Intra/Inter-frequency LTE measurements and/or Inter-RAT (radio access technology)) and to report the measurement results towards the radio access network, i.e. the respective base station entity. The basic idea is to align the measurements and the reporting of the measurements to tasks that the user equipment needs to do anyway and thus to reduce the burden for the user equipment (to perform measurements and especially to report the measurement results (local network information) to the base station entity) and/or for the radio access network (or base station entity) for network optimization purposes.

The method, user equipment, mobile communication network, and system according to the present invention is applicable to any cellular radio network technology, and provides improvements especially in E-UTRAN (LTE).

According to conventionally known measurement configurations transmitted by the respective base station entity to a concerned (typically active) user equipment (within the radio cell of the base station entity), all measurements indicated (via one or a plurality of pieces of measurement configuration information) to the user equipment typically are mandatory to be executed by the user equipment and, likewise, to be reported (towards the base station entity or eNodeB) mandatorily, at least as long as the user equipment is in active mode. An example of such conventionally known measurement configurations, there are optimization (especially network optimization) use cases—for example within the context of the 'network optimisation measurement' or MDT (minimization of drive tests)—where, e.g., report-strongest-cell-measurements on a periodical basis have to be performed and reported to the radio access network. As long as the user equipment is uplink synchronized with the mobile communication network (or its radio access network, i.e. the base station entity) the impact of the transmission of such measurement reports regarding the overall system performance (i.e. regarding the mobile communication network and/or regarding the user equipment), e.g. because of signalling load (of the air interface) and/or user equipment energy consumption, can be accepted, i.e. the additional impact can be regarded as negligible in view of the resulting benefit in terms of the measurement purpose such as network optimization.

However, within the context of the conventionally known 3GPP recommendations, it is a drawback to (require the user equipment to) transmit such measurement reports in case that the user equipment is in Out of UL Sync state (i.e. out of uplink synchronization state). Especially the situation that the user equipment is out of uplink synchronization leads to the effect that in order to transmit the measurement report to the base station entity, the user equipment needs to synchronize again with the mobile communication network via the RACH-procedure (of the respective base station entity) and has to request radio resources for the later transmission of the measurement reports. Besides the needed additional signalling and its impact on the uplink and/or downlink (UL/DL) air interface (e.g. interference effects) and onto other parts of the network, the entire procedure requires user equipment battery power and that only for the purpose of reporting measurements that are not mandatory and/or needed for radio resource management and/or mobility of the user equipment.

Besides the drawbacks associated with measurement reporting (i.e. the fact to report measurements), also the user equipment measurements themselves might impact the end customer performance, user equipment battery consumption and network capacity. This comes from the fact that for Inter-frequency and Inter-RAT (radio access technology) measurements, the user equipment requires measurement gaps (during which functionality regarding an used frequency band of the user equipment is not available (e.g. for communication purposes and/or paging purposes), as a radio interface of the user equipment is used in another frequency band and/or another radio access technology (involving another frequency band)). Typically in such case, the measurements are instructed by the mobile communication network which also configures the needed measurement gaps.

According to the present invention, in order to avoid such mentioned drawbacks (related to the act of reporting the measurement results and/or related to the act to perform the measurements, i.e. non-complete Long-DRX usage, delayed activation of Long-DRX state of the user equipment, need to setup RACH-procedure (random access channel) to synchronize in uplink with the network, additional UE battery power consumption due to performing measurements and/or due to reporting the measurement results, reduced network capacity), embodiments of the present invention provide the measurement configuration information (transmitted to the user equipment and defining the measurements to be conducted) with an indication that a requested measurement, to be conducted by the user equipment and resulting in obtaining a local network information (i.e. measurement results), shall be reported to the base station entity together with at least one other uplink transmission performed by the user equipment using the at least one radio interface of the user equipment. Thereby, it is advantageously possible according to the present invention to convey to the user equipment that the requested measurement (or a plurality of requested measurements) does not need to be conducted immediately (or almost immediately) but can be delayed (at least the reporting of the corresponding measurement results can be delayed) until at least one other uplink transmission is performed by the user equipment (i.e. is to be performed anyway by the user equipment, due to other mandatory events such as a communication need of the user of the user equipment and/or an uplink transmission of signalling information). The present invention establishes a special kind of measurement configuration for network optimization purposes. This kind of measurement configuration for network optimization purposes is not time critical (i.e. it is of time uncritical nature). It allows the user equipment to align conducting the Inter-frequency and/or Inter-RAT measurements for network optimization purpose together with other tasks such as:

already configured and assigned measurement gaps for Inter-frequency and/or Inter-RAT mobility measurements for mobility purposes or to perform these measurements in next DRX off duration (usage of natural measurement gaps)

and/or reporting of the Intra-frequency and/or Inter-frequency and /or InterRAT-measurement results only together with other tasks such as:

any other kind of needed, mandatory uplink data transmissions.

According to the present invention, the measurement configuration information (with the indication that a requested measurement shall be reported to the base station entity together with at least one other uplink transmission performed by the user equipment), i.e. the new measurement and reporting type, is preferably used or intended for network optimisation tasks, and is suitable for any target (own frequency band measurements, intra-frequency measurements, inter-frequency measurements and Inter-RAT measurement).

According to the inventive method, the measurement configuration information is transmitted from the mobile communication network, i.e. the base station entity, to the user equipment. The measurement configuration information is especially based on a user equipment type indication information or user equipment type indication information being signalled (prior to the transmission of the measurement configuration information) by the user equipment via a control channel. The measurement configuration information is transmitted using a control channel of the mobile communication network, i.e. from the perspective of the mobile communication network, the measurement configuration information is signalling information transmitted to the user equipment. In a subsequent step, a local network information is obtained, by conducting the measurement, by the user equipment. The current location of the user equipment (at the time of the detection of the local network information) is hereinafter also called the measurement user equipment location. In a subsequent step of the inventive method, the local network information is transmitted to the base station entity.

In the context of the present invention, the terms "radio access network node" and "base station entity" are used synonymously and refer to the evolved Node B (eNodeB or eNB) in LTE (Long Term Evolution), and the radio network controller (RNC) in UMTS (Universal Mobile Telecommunication System).

According to embodiments of the present invention, the measurement configuration information comprises data that enable the user equipment to determine which measurements shall be performed when and/or where and/or according to which procedure and/or which parameters. Preferably, these data (of the measurement configuration information) also take into account information of the feature group indicator, especially whether the user equipment is or is more likely to be a stationary user equipment (e.g. a router) or whether the user equipment is or is more likely to be a mobile user equipment or whether the user equipment is or is more likely to be a fast-moving user equipment.

According to the present invention, it is possible to configure/activate more than one of the new kind of measurement configurations and reporting type at the same time or in parallel with individual settings especially for different user equipments in the base station. Thereby, it is advantageously possible to support individual configuration settings for stationary user equipments, like routers with fixed network power supply (or commercial tariffs designed to cover stationary products, marked via defined settings in the SIM (subscriber identity module within the user equipment) or user-profile in HSS (home subscriber server)) and mobile devices, like smartphones. For the differentiation of the stationary/mobile user equipments (or tariffs/SIM-profiles representing it), it is preferred to use the following criterions: SPID (Service Profile Identifier) as handled in the HSS, Configured APNs (access point names) or related IP-addresses for such services. Especially, the existing feature group indicators are enhanced with an indicator (user equipment type indication) to describe the mobility class of the user equipment (such as, e.g., stationary, mobile, fast moving mobile (e.g. a box in a plane or fast train)). Especially for the use case "stationary user equipment" it shall be possible to further reduce the amount of measurements and reports which are behind the optimization tasks, like geo-location of the user equipment.

It is preferred that the transmission of the local network information is aligned with the at least one other uplink transmission performed by the user equipment.

Furthermore, it is preferred according to the present invention that the local network information is transmitted in the same or contiguous physical transmission resource with the at least one other uplink transmission.

With both
the alignment of the transmission of the local network information with the at least one other uplink transmission performed by the user equipment, and/or
the transmission of the local network information in the same or contiguous physical transmission resource with the at least one other uplink transmission,
it is advantageously possible that the local network information is not transmitted without further uplink traffic from the user equipment towards the base station entity, i.e. solely in order to transmit the local network information related to the measurement performed in response to the measurement configuration information (with the indication that a requested measurement shall be reported to the base station entity together with at least one other uplink transmission performed by the user equipment, i.e. the new measurement and reporting type), no (new) uplink transmission is performed nor prepared (via a request, by the user equipment, to be uplink synchronised with the base station entity.

The same or contiguous physical transmission resource thereby relates to the same transmission power, transmission frequency, scrambling code and time slot. This means that the trigger for a user equipment to perform the signalisation traffic to request to become uplink synchronised is not the transmission of the local network information (according to the present invention), but the other uplink transmission (which is to be performed mandatorily) whether it be a measurement information regarding another measurement configuration information (than regarding the local network information), or a transmission initiated by the user of the user equipment or requested by an application running on the user equipment.

According to the present invention, it is preferred that the initiation of an uplink synchronization of the user equipment solely due to transmitting the local network information is avoided.

Thereby, it is advantageously possible to avoid performing the signalling in order to obtain uplink synchronization as well as the related battery drain just for transmitting the local network information. Especially, it is also avoided to initiate uplink synchronization in the situation that transmission of two different pieces of local network information could be transmitted by the user equipment, the two different pieces of local network information being related to two different pieces of measurement configuration information, both carrying the (respective) indication that a requested measurement shall be reported to the base station entity together with at least one other uplink transmission performed by the user equipment: Also in such a situation, the initiation of uplink synchronization shall be avoided. This means that one of the two pieces of different local network information cannot act as "the at least one other uplink transmission performed by the user equipment" with respect to the other piece of local network information.

The reporting of the local network information for network optimisation tasks according to the present invention is preferably defined by a predefined number of reports and a minimal reporting interval. The user equipment shall align the reporting with other uplink transmissions (e.g. data transmission or signalling). The minimal reporting interval means that the user equipment shall use the next uplink transmissions following the expiration of the reporting interval.

According to a preferred embodiment of the present invention, the transmission of the measurement configuration information is part of a signalling procedure of the radio resource control (RRC) of the mobile communication network.

Thereby, it is advantageously possible according to the present invention to transmit the measurement configuration information as part of signalling data exchanged between the mobile communication network and the user equipment.

Furthermore, it is preferred according to the present invention that—during a fourth step subsequent to the second step and prior to the third step—the local network information is logged by the user equipment during a time interval between the point in time of conducting the requested measurement of the local network information and the point in time of the user equipment being uplink synchronized with the base station entity, wherein the logging during the fourth step is performed during at most a time interval of a predetermined duration.

Thereby, it is advantageously possible to store the local network information in a memory device of the user equipment during the time interval between the point in time of conducting the requested measurement of the local network information and the point in time of the user equipment being uplink synchronized with the base station entity. The predetermined time interval of the predetermined duration corresponds to the time to live of the local network information within the user equipment (typically within the memory device of the user equipment). This means that in case that no uplink synchronization is performed (in order to transmit the at least one other uplink transmission performed by the user equipment), the local network information will not be transmitted to the base station entity. The stored local network information will have to be removed, i.e. deleted, at some point in time, especially in case that one of the following conditions apply:

a defined life time of the local network information expires and/or the user equipment changes from active mode towards idle mode.

The stored local network information will have to be removed, i.e. deleted, and possibly overwritten by newer local network information at some point in time, especially in case that newer local network information exist, i.e. a further measurement providing local network information has been conducted.

Latest, the stored local network information shall be cleaned (i.e. deleted) if the user equipment moves next time from idle into active mode and/or removed if the mobile communication network finishes or removes the related measurement job.

According to the present invention, it is preferred that the measurement configuration information comprises—in addition to indicating that the requested measurement shall be conducted by the user equipment and the resulting local network information be reported to the base station entity together with the at least one other uplink transmission performed by the user equipment—the additional indication that the requested measurement is to be conducted in the second step only in case that the battery performance of the user equipment is sufficiently strong or above a predefined battery threshold or in case that the user equipment is connected to a battery recharger or the grid.

Thereby, it is advantageously possible according to the present invention that the battery drain of the user equipment is avoided for the transmission of the local network information in case of a low battery status (or in case of no connection of the user equipment to a battery charger and/or to the electrical grid).

It is preferred according to the present invention that—especially upon connecting, by the user equipment, to the mobile communication network—a user equipment type indication information is transmitted from the user equipment to the base station entity, wherein the user equipment type indication information comprises a user equipment class information, wherein the user equipment class information indicates that the user equipment belongs to one out of at least the following classes of user equipments:

a router type user equipment class, a mobile type user equipment class, a fast-moving type user equipment class, wherein the measurement requested by the measurement configuration information shall be conducted by the user equipment and the resulting local network information be reported to the base station entity dependent on the user equipment class information of the user equipment stored in the base station entity, especially with respect to whether or not the measurement shall be conducted, how often the measurement shall be conducted and/or the time interval between the measurements shall be performed of the user equipment and/or during which predetermined time-of-life time interval the measurement configuration information shall be valid.

Thereby, it is advantageously possible according to the present invention to adapt the pattern of the required measurements to be performed (and reported) by the user equipment to the user equipment class information, i.e. to the nature or typical use of the user equipment. For example, in case of a fast-moving type user equipment, it might be indicated by the measurement configuration information that no measurement at all or only a limited number of measurement repetitions is required. Likewise, in case of a router type user equipment, it might be indicated by the measurement configuration information that a limited number of measurement repetitions shall be required (especially in order to determine the location of the user equipment) and furthermore no additional measurements shall be required. Likewise, in case of a mobile type user equipment, it might be indicated by the measurement configuration information that a measurements shall be repeated regularly (especially in order to determine the location of the user equipment).

Furthermore, it is preferred according to the present invention that, in case of the user equipment class information of the user equipment corresponding to the router type user equipment class, the measurement configuration information comprises an additional indication that the requested measurement is to be conducted in the second step only a predetermined number of times, in case of the user equipment class information of the user equipment corresponding to the fast moving type user equipment class, the measurement configuration information comprises an additional indication that the requested measurement is to be conducted in the second step only a predetermined number of times.

Furthermore, it is preferred according to the present invention that the measurement configuration information comprises an indication to the user equipment to perform inter-frequency and/or inter-RAT (radio access technology) measurements only in case that at most a predefined serving number of serving base station entities are detectable by the user equipment, wherein inter-frequency measurements and/or inter-RAT measurements are performed by the user equipment only in case that the detected number of serving base station entity corresponds at most to the predefined serving number.

Thereby, it is advantageously possible to invoke inter-frequency and/or inter-RAT measurements (and likewise the use of measurement gaps) only in case that the number of serving base station entity is not sufficient, especially not sufficient in order to determine the location of the user equipment). The term "serving base station entity" most broadly involves all kinds of base station entities, i.e. intra-frequency (intra-LTE) base station entities as well as inter-frequency base station entities and inter-RAT base station entities. However in this specific situation of avoiding—if possible—inter-frequency and/or inter-RAT measurements, "serving base station entity" is primarily directed to the base station entities of the intra-frequency type.

Preferably, the measurement configuration information indicates that in case of specifying inter-frequency and/or inter-RAT measurements, the measurements shall only be performed by the user equipment in case that measurement gaps are configured for mobility purposes or natural measurement gaps (e.g. DRX off duration).

The present invention further relates to a method for the transmission of environment-related information between a user equipment and a mobile communication network, wherein the mobile communication network comprises a base station entity, wherein the user equipment comprises at least one radio interface, wherein an uplink radio connection between the user equipment and the base station entity is at least able to be established using the at least one radio interface of the user equipment, wherein the method comprises the following steps:

transmitting, in a first step, a measurement configuration information from the mobile communication network to the user equipment, wherein a control channel of the mobile communication network is used for the transmission of the measurement configuration information, detecting, in a second step subsequent to the first step, a local network information by conducting the requested measurement, and transmitting, in a third step subsequent to the second step, the local network information to the base station entity by using the at least one radio interface of the user equipment, wherein the measurement configuration information comprises an indication to the user equipment to perform inter-frequency and/or inter-RAT (radio access technology) measurements only in case that at most a predefined serving number of serving base station entities are detectable by the user equipment, wherein inter-frequency measurements and/or inter-RAT measurements are performed by the user equipment only in case that the detected number of serving base station entity corresponds at most to the predefined serving number.

Thereby, it is advantageously possible to perform and report inter-frequency and/or inter-RAT measurements in case that the number of serving base station entities (i.e. of arbitrary type) is not sufficient especially to allow for a localization of the user equipment. This means that according to such an embodiment of the present invention (contrary to the other embodiments of the present invention, described above), uplink synchronization is invoked even without at least one other uplink transmission is performed by the user equipment.

Furthermore, the present invention relates to a user equipment for enhancing the usage of user equipment resources and/or network resources related to the transmission of environment-related information between the user equipment and a mobile communication network, wherein the mobile communication network comprises a base station entity, wherein the user equipment comprises at least one radio interface, wherein an uplink radio connection between the user equipment and the base station entity is at least able to be established using the at least one radio interface of the user equipment, wherein the user equipment is configured such as:

to receive a measurement configuration information from the mobile communication network, wherein a control channel of the mobile communication network is used for the transmission of the measurement configuration information, and wherein the measurement configuration information comprises an indication that a requested measurement, to be conducted by the user equipment and resulting in obtaining a local network information, shall be reported to the base station entity together with at least one other uplink transmission performed by the user equipment using the at least one radio interface of the user equipment, to obtain the local network information by conducting the requested measurement and to transmit the local network information together with the at least one other uplink transmission performed by the user equipment to the base station entity by using the at least one radio interface of the user equipment.

All preferred embodiments as mentioned above with regard to the inventive method are also—mutatis mutandis—to be applied to the user equipment.

Additionally, the present invention relates to a mobile communication network for enhancing the usage of user equipment resources and/or network resources related to the transmission of environment-related information between a user equipment and the mobile communication network, wherein the mobile communication network comprises a base station entity, wherein the user equipment comprises at least one radio interface, wherein an uplink radio connection between the user equipment and the base station entity is at least able to be established using the at least one radio interface of the user equipment, wherein the mobile communication network is configured such that:

a measurement configuration information is transmitted from the mobile communication network to the user equipment, wherein a control channel of the mobile communication network is used for the transmission of the measurement configuration information, and wherein the measurement configuration information comprises an indication that a requested measurement, to be conducted by the user equipment and resulting in obtaining a local network information, shall be reported to the base station entity together with at least one other uplink transmission performed by the user equipment using the at least one radio interface of the user equipment, the local network information is transmitted together with the at least one other uplink transmission performed by the user equipment to the base station entity using the at least one radio interface of the user equipment.

All preferred embodiments as mentioned above with regard to the inventive method are also—mutatis mutandis—to be applied to the mobile communication network.

Additionally, the present invention also relates to a system for enhancing the usage of user equipment resources and/or network resources related to the transmission of environment-related information between a user equipment and a mobile communication network, wherein the mobile communication network comprises a base station entity, wherein the user equipment comprises at least one radio interface, wherein an uplink radio connection between the user equipment and the base station entity is at least able to be established using the at least one radio interface of the user equipment, wherein the user equipment is configured such as:

to receive a measurement configuration information from the mobile communication network, wherein a control channel of the mobile communication network is used for the transmission of the measurement configuration information, and wherein the measurement configuration information comprises an indication that a requested measurement, to be conducted by the user equipment and resulting in obtaining a local network information, shall be reported to the base station entity together with at least one other uplink transmission performed by the user equipment using the at least one radio interface of the user equipment, to obtain the local network information by conducting the requested measurement in case that the result of the decision whether or not to conduct the requested measurement is affirmative, and to transmit the local network information together with the at least one other uplink transmission performed by the user equipment to the base station entity by using the at least one radio interface of the user equipment, and wherein the mobile communication network is configured such that:

the measurement configuration information is transmitted from the mobile communication network to the user equipment, wherein the control channel of the mobile communication network is used for the transmission of the measurement configuration information, and wherein the measurement configuration information comprises the indication that the requested measurement, to be conducted by the user equipment and resulting in obtaining a local network information, shall be reported to the base station entity together with at least one other uplink transmission performed by the user equipment using the at least one radio interface of the user equipment, the local network information is transmitted together with the at least one other uplink transmission performed by the user equipment to the base station entity using the at least one radio interface of the user equipment.

All preferred embodiments as mentioned above with regard to the inventive method are also—mutatis mutandis—to be applied to the inventive system comprising a user equipment and a mobile communication network.

Additionally, the present invention relates to a program comprising a computer readable program code which, when executed on a computer and/or on a network entity of a mobile communication network and/or on a base station entity of a mobile communication network and/or on a user equipment, causes the computer and/or the network entity of the mobile communication network and/or the base station entity of the mobile communication network and/or the user equipment to perform the inventive method.

Still additionally, the present invention relates to computer program product for using a machine type communication device with a mobile communication network, the computer program product comprising a computer program stored on a storage medium, the computer program comprising program code which, when executed on the computer and/or on the network entity of the mobile communication network and/or on the base station entity of the mobile communication network and/or on the user equipment, causes the computer and/or the network entity of the mobile communication network and/or the base station entity of the mobile communication network and/or the user equipment to perform the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a mobile communication network 100, especially a public land mobile network 100, is schematically shown, the mobile communication network 100 comprising an access network 110 (or a radio access network 110) and a core network 120. The mobile communication network 100 is preferably a cellular telecommunications network comprising typically a plurality of network cells or radio cells. A radio cell typically comprises at least one base station entity. One radio cell 11 is exemplarily represented in FIG. 1, the radio cell 11 comprising one base station entity 111.

According to the present invention, a user equipment 20 camps on the radio cell 11 or on the mobile communication network 100 or on the base station entity 111. This is represented in FIG. 1 by showing the user equipment 20 within the radio cell 11.

The user equipment 20 comprises at least one radio interface 21. The at least one radio interface 21 is a radio interface according to a mobile communication standard, like 3GPP. The at least one radio interface 21 of the user equipment 20 is used for the radio connection between the user equipment 20 and the base station entity 111. This radio connection is established in both directions (i.e. both in downlink direction as well as in uplink direction) in case that the user equipment 20 is in connected state. The radio connection between the user equipment 20 and the mobile communication network (or the base station entity 111) is not established (at least in one direction, typically in uplink direction) in case that the user equipment 20 is in idle mode (i.e. is (only) camping on the base station entity 111 or on the mobile communication network 100 but not in an active communication involving the exchange of payload data). This means that the radio connection between the user equipment 20 and the mobile communication network 100 (or the base station entity 111) is at least able to be established using the at least one radio interface 21 of the user equipment 20. In order to get uplink synchronised to the mobile communication network 100, i.e. the base station entity 111, the user equipment 20 needs to perform some signalling, especially requesting uplink resources from the base station entity 111 via a random access channel procedure. According to the present invention, in case of no uplink synchronization of the user equipment 20 at the time a local network information could be sent to the base station entity 111, requesting uplink resources is avoided according to measurement configuration information received by the user equipment 20 from the mobile communication network 100, i.e. from the base station entity 111.

The repetition of measurements and the transmission of the respective local network information towards the base station entity 111 is reduced or at least avoided in case that sufficient other serving base station entities 310, 320 of other radio cells 31, 32 can be detected by the user equipment 20.

Especially in case of a user equipment belonging to the class of stationary user equipments (i.e. a fixed location of the user equipment 20), only few measurements (e.g. report strongest cell, RSRP) are needed. Likewise, it is assumed that the amount and kind of serving base station entities (or servers), such as of different RAT-technologies and their RSRP values) are quite constant, which means that their fluctuation is based mainly on slow processes over the time. The usage of inter-frequency and inter-RAT measurements with the needed measurement gaps shall preferably only apply (for network optimization tasks) if a configurable amount, e.g. three to perform triangulation, of servings cells is not reached. For example, inter-frequency and inter-RAT measurements shall only be executed by the user equipment if only the serving cell can be measured within the intra-Frequency measurement, or InterRAT measurements shall only be executed if only two servers each per two configured LTE-frequency bands are measured. As further option, the inter-frequency and inter-RAT measurements, including a maximum amount of available serving base station entities (or server/s) are defined by the measurement configuration information transmitted by the base station entity 111, i.e. typically an eNodeB, to the user equipment 20. In combination with the inventive kind of measurement type, the user equipment 20 decides by themselves to perform these measurements, e.g. in an autonomous or natural measurement gap defined by the user equipment, if the user equipment starts with LongDRX. If the user equipment is categorized in the feature group indication as "stationary", these measurements and especially the reporting have only to be performed a few times (the maximum number of times shall be configurable, i.e. predefined) as long as the user equipment is attached to the mobile communication network 100. In case of a "mobile" device, these measurements and reporting shall be performed a few times (the maximum number of times shall be configurable, i.e. predefined) and the procedure repeated, if the serving cell is changed (per cell reselection in idle mode or per handover in connected mode). For user equipments classified as "fast moving mobile", the measurement configuration information shall be possible to be configured such that the base station entity 111, i.e. typically the eNodeB, activates only RRM (radio resource management) and mobility related measurements and does not require the user equipment and the mobile communication network to provide or require any network optimization based measurements.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for transmission of environment-related information between a user equipment and a mobile communication network, wherein the method comprises:
receiving, in a first step, measurement configuration information from the mobile communication network, wherein the mobile communication network comprises a base station entity, wherein the user equipment comprises at least one radio interface, wherein an uplink radio connection between the user equipment and the base station entity is at least able to be established using the at least one radio interface of the user equipment, wherein a control channel of the mobile communication network is used for the transmission of the measurement configuration information, and wherein the measurement configuration information comprises an indication that a requested measurement shall be reported to the base station entity together with at least one other uplink transmission performed by the user equipment using the at least one radio interface of the user equipment;
obtaining the local network information by conducting the requested measurement, in a second step subsequent to the first step; and
transmitting, in a third step subsequent to the second step, the local network information together with the at least one other uplink transmission performed by the user equipment to the base station entity by using the at least one radio interface of the user equipment;
wherein, during a fourth step subsequent to the second step and prior to the third step, the local network information is logged by the user equipment during a time interval between a point in time of conducting the requested measurement of the local network information and a point in time of the user equipment being uplink synchronized with the base station entity;
wherein user equipment type indication information is transmitted from the user equipment to the base station entity, wherein the user equipment type indication information comprises user equipment class information, wherein the user equipment class information indicates that the user equipment belongs to one out of at least the following classes of user equipments: a router type user equipment class, a mobile type user equipment class, and a fast moving type user equipment class;
wherein the requested measurement is conducted by the user equipment and the resulting local network information is reported to the base station entity dependent on the user equipment class information of the user equipment stored in the base station entity; and
wherein in case of the user equipment class information of the user equipment corresponding to the router type user equipment class or the fast moving type user equipment class, the measurement configuration information comprises an additional indication that the requested measurement is to be conducted in the second step only a predetermined number of times.

2. The method according to claim 1, wherein the transmission of the local network information is aligned with the at least one other uplink transmission performed by the user equipment.

3. The method according to claim 1, wherein the local network information is transmitted in the same or contiguous physical transmission resource with the least one other uplink transmission.

4. The method according to claim 1, wherein the initiation of an uplink synchronization of the user equipment solely due to transmitting the local network information is avoided.

5. The method according to claim 1, wherein the measurement configuration information comprises, in addition to indicating that the requested measurement shall be conducted by the user equipment and the resulting local network information be reported to the base station entity together with the at least one other uplink transmission performed by the user equipment, the additional indication that the requested measurement is to be conducted in the second step only in case that the battery performance of the user equipment is sufficiently strong or above a predefined battery threshold or in case that the user equipment is connected to a battery recharger or the grid.

6. The method according to claim 1, wherein the measurement configuration information comprises an indication to the user equipment to perform inter-frequency and/or inter-radio access technology (RAT) measurements only in case that at most a predefined number of serving base station entities are detectable by the user equipment.

7. A method for transmission of environment-related information between a user equipment and a mobile communication network, wherein the method comprises:
receiving, in a first step, measurement configuration information from the mobile communication network, wherein the mobile communication network comprises a base station entity, wherein the user equipment comprises at least one radio interface, wherein an uplink radio connection between the user equipment and the base station entity is at least able to be established using the at least one radio interface of the user equipment, wherein a control channel of the mobile communication network is used for the transmission of the measurement configuration information;
detecting, in a second step subsequent to the first step, local network information by conducting a requested measurement; and
transmitting, in a third step subsequent to the second step, the local network information to the base station entity by using the at least one radio interface of the user equipments;
wherein, during a fourth step subsequent to the second step and prior to the third step, the local network information is logged by the user equipment during a time interval between a point in time of conducting the requested measurement of the local network information and a point in time of the user equipment being uplink synchronized with the base station entity;

wherein the measurement configuration information comprises an indication to the user equipment to perform inter-frequency and/or inter-radio access technology (RAT) measurements only in case that at most a predefined serving number of serving base station entities are detectable by the user equipment;

wherein user equipment type indication information is transmitted from the user equipment to the base station entity, wherein the user equipment type indication information comprises user equipment class information, wherein the user equipment class information indicates that the user equipment belongs to one out of at least the following classes of user equipments: a router type user equipment class, a mobile type user equipment class, and a fast moving type user equipment class;

wherein the requested measurement is conducted by the user equipment and the resulting local network information is reported to the base station entity dependent on the user equipment class information of the user equipment stored in the base station entity; and wherein in case of the user equipment class information of the user equipment corresponding to the router type user equipment class or the fast moving type user equipment class, the measurement configuration information comprises an additional indication that the requested measurement is to be conducted in the second step only a predetermined number of times.

8. A user equipment for transmission of environment-related information between the user equipment and a mobile communication network, wherein the user equipment comprises a processor and a non-transitory processor-readable medium having processor-executable instructions stored thereon, wherein the processor, based on execution of the processor-executable instructions, is configured to facilitate:

receiving measurement configuration information from the mobile communication network, wherein the mobile communication network comprises a base station entity, wherein the user equipment comprises at least one radio interface, wherein an uplink radio connection between the user equipment and the base station entity is at least able to be established using the at least one radio interface of the user equipment, wherein a control channel of the mobile communication network is used for the transmission of the measurement configuration information, and wherein the measurement configuration information comprises an indication that a requested measurement shall be reported to the base station entity together with at least one other uplink transmission performed by the user equipment using the at least one radio interface of the user equipment;

obtaining the local network information by conducting the requested measurement;

logging the local network information during a time interval between a point in time of conducting the requested measurement of the local network information and a point in time of the user equipment being uplink synchronized with the base station entity; and transmitting the local network information together with the at least one other uplink transmission performed by the user equipment to the base station entity by using the at least one radio interface of the user equipment;

wherein the processor, based on execution of the processor-executable instructions, is further configured to facilitate: user equipment type indication information being transmitted from the user equipment to the base station entity, wherein the user equipment type indication information comprises user equipment class information, wherein the user equipment class information indicates that the user equipment belongs to one out of at least the following classes of user equipments: a router type user equipment class, a mobile type user equipment class, and a fast moving type user equipment class;

wherein conducting the requested measurement and reporting the resulting local network information to the base station entity is dependent on the user equipment class information of the user equipment stored in the base station entity; and wherein in case of the user equipment class information of the user equipment corresponding to the router type user equipment class or the fast moving type user equipment class, the measurement configuration information comprises an additional indication that the requested measurement is to be conducted only a predetermined number of times.

9. A system, comprising:
a user equipment; and
a mobile communication network;
wherein the mobile communication network comprises a base station entity;
wherein the user equipment comprises at least one radio interface;
wherein an uplink radio connection between the user equipment and the base station entity is at least able to be established using the at least one radio interface of the user equipment;
wherein the user equipment is configured to:
receive measurement configuration information from the mobile communication network, wherein a control channel of the mobile communication network is used for the transmission of the measurement configuration information, and wherein the measurement configuration information comprises an indication that a requested measurement shall be reported to the base station entity together with at least one other uplink transmission performed by the user equipment using the at least one radio interface of the user equipment;
obtain the local network information by conducting the requested measurement;
log the local network information during a time interval between a point in time of conducting the requested measurement of the local network information and a point in time of the user equipment being uplink synchronized with the base station entity; and
transmit the local network information together with the at least one other uplink transmission performed by the user equipment to the base station entity by using the at least one radio interface of the user equipment; and
wherein the mobile communication network is configured to:
transmit the measurement configuration information to the user equipment; and
receive the local network information together with the at least one other uplink transmission performed by the user equipment using the at least one radio interface of the user equipment;

wherein the user equipment is further configured to transmit user equipment type indication information to the base station entity, wherein the user equipment type indication information comprises user equipment class information, wherein the user equipment class information indicates that the user equipment belongs to one out of at least the following classes of user equipments: a router type user equipment class, a mobile type user equipment class, and a fast moving type user equipment class;

wherein conducting the requested measurement and reporting the resulting local network information to the base station entity is dependent on the user equipment class information of the user equipment stored in the base station entity; and wherein in case of the user equipment class information of the user equipment corresponding to the router type user equipment class or the fast moving type user equipment class, the measurement configuration information comprises an additional indication that the requested measurement is to be conducted only a predetermined number of times.

10. A non-transitory computer-readable medium having processor-executable instructions stored thereon for transmission of environment-related information between a user equipment and a mobile communication network, wherein the processor-executable instructions, when executed, facilitate performance of the following:

receiving, in a first step, measurement configuration information from the mobile communication network, wherein the mobile communication network comprises a base station entity, wherein the user equipment comprises at least one radio interface, wherein an uplink radio connection between the user equipment and the base station entity is at least able to be established using the at least one radio interface of the user equipment, wherein a control channel of the mobile communication network is used for the transmission of the measurement configuration information, and wherein the measurement configuration information comprises an indication that a requested measurement shall be reported to the base station entity together with at least one other uplink transmission performed by the user equipment using the at least one radio interface of the user equipment;

obtaining the local network information by conducting the requested measurement, in a second step subsequent to the first step; and transmitting, in a third step subsequent to the second step, the local network information together with the at least one other uplink transmission performed by the user equipment to the base station entity by using the at least one radio interface of the user equipment;

wherein the processor-executable instructions, when executed, further facilitate performance of the following: during a fourth step subsequent to the second step and prior to the third step, the local network information being logged by the user equipment during a time interval between a point in time of conducting the requested measurement of the local network information and a point in time of the user equipment being uplink synchronized with the base station entity;

wherein the processor-executable instructions, when executed, further facilitate performance of the following: user equipment type indication information being transmitted from the user equipment to the base station entity, wherein the user equipment type indication information comprises user equipment class information, wherein the user equipment class information indicates that the user equipment belongs to one out of at least the following classes of user equipments: a router type user equipment class, a mobile type user equipment class, and a fast moving type user equipment class;

wherein conducting the requested measurement and reporting the resulting local network information to the base station entity is dependent on the user equipment class information of the user equipment stored in the base station entity; and wherein in case of the user equipment class information of the user equipment corresponding to the router type user equipment class or the fast moving type user equipment class, the measurement configuration information comprises an additional indication that the requested measurement is to be conducted in the second step only a predetermined number of times.

11. A non-transitory computer-readable medium having processor-executable instructions stored thereon for transmission of environment-related information between a user equipment and a mobile communication network, wherein the processor-executable instructions, when executed, facilitate performance of the following:

receiving, in a first step, measurement configuration information from the mobile communication network, wherein the mobile communication network comprises a base station entity, wherein the user equipment comprises at least one radio interface, wherein an uplink radio connection between the user equipment and the base station entity is at least able to be established using the at least one radio interface of the user equipment, wherein a control channel of the mobile communication network is used for the transmission of the measurement configuration information;

detecting, in a second step subsequent to the first step, local network information by conducting a requested measurement; and transmitting, in a third step subsequent to the second step, the local network information to the base station entity by using the at least one radio interface of the user equipment;

wherein the measurement configuration information comprises an indication to the user equipment to perform inter-frequency and/or inter-radio access technology (RAT) measurements only in case that at most a predefined serving number of serving base station entities are detectable by the user equipment;

wherein the processor-executable instructions, when executed, further facilitate performance of the following: during a fourth step subsequent to the second step and prior to the third step, the local network information being logged by the user equipment during a time interval between a point in time of conducting the requested measurement of the local network information and a point in time of the user equipment being uplink synchronized with the base station entity;

wherein the processor-executable instructions, when executed, further facilitate performance of the following: user equipment type indication information being transmitted from the user equipment to the base station entity, wherein the user equipment type indication information comprises user equipment class information, wherein the user equipment class information indicates that the user equipment belongs to one out of at least the following classes of user equipments: a router type user equipment class, a mobile type user equipment class, and a fast moving type user equipment class;

wherein conducting the requested measurement and reporting the resulting local network information to the base station entity is dependent on the user equipment class information of the user equipment stored in the base station entity; and wherein in case of the user equipment class information of the user equipment corresponding to the router type user equipment class or the fast moving type user equipment class, the measurement configuration information comprises an additional indication that the requested measurement is to be conducted in the second step only a predetermined number of times.

* * * * *